US009158411B2

(12) United States Patent
Leigh

(10) Patent No.: US 9,158,411 B2
(45) Date of Patent: Oct. 13, 2015

(54) FAST MULTI-TOUCH POST PROCESSING

(71) Applicant: Tactual Labs Co., New York, NY (US)

(72) Inventor: Darren Leigh, Round Hill, VA (US)

(73) Assignee: Tactual Labs Co., New York, NY (US)

(*) Notice: Subject to any disclaimer, the term of this patent is extended or adjusted under 35 U.S.C. 154(b) by 159 days.

(21) Appl. No.: 14/069,609

(22) Filed: Nov. 1, 2013

(65) Prior Publication Data

US 2015/0015497 A1 Jan. 15, 2015

Related U.S. Application Data

(60) Provisional application No. 61/845,892, filed on Jul. 12, 2013.

(51) Int. Cl.
*G06F 3/041* (2006.01)
(52) U.S. Cl.
CPC .................. *G06F 3/0416* (2013.01)
(58) Field of Classification Search
None
See application file for complete search history.

(56) References Cited

U.S. PATENT DOCUMENTS

2014/0267140 A1* 9/2014 Leigh et al. ............... 345/174

* cited by examiner

Primary Examiner — Kenneth B Lee, Jr.
(74) Attorney, Agent, or Firm — Greenberg Traurig, LLP

(57) ABSTRACT

In a low-latency touch-sensitive device, post-processing is performed to convert a two-dimensional map of signal strengths into usable touch events. Four such post-processing procedures are disclosed: field flattening, touch point detection, interpolation and touch point matching between frames. The field flattening procedure subtracts an offset to remove crosstalk between rows and columns, and compensates for differences in amplitude between particular row/column combinations due to attenuation. The touch point detection procedure computes coarse touch points by finding local maxima in the flattened signal. The interpolation procedure computes fine touch points from the coarse touch points. In an embodiment, such interpolation is done by fitting the coarse touch points to a paraboloid. The frame matching procedure matches the calculated touch points to each other across frames.

37 Claims, 4 Drawing Sheets

FAST MULTI-TOUCH POST PROCESSING

This application is a non-provisional of and claims priority to U.S. Provisional Patent Application No. 61/845,892 filed Jul. 12, 2013. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed system and method relate in general to the field of user input, and in particular to user input systems which provide fast multi-touch post processing.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Figure 1:
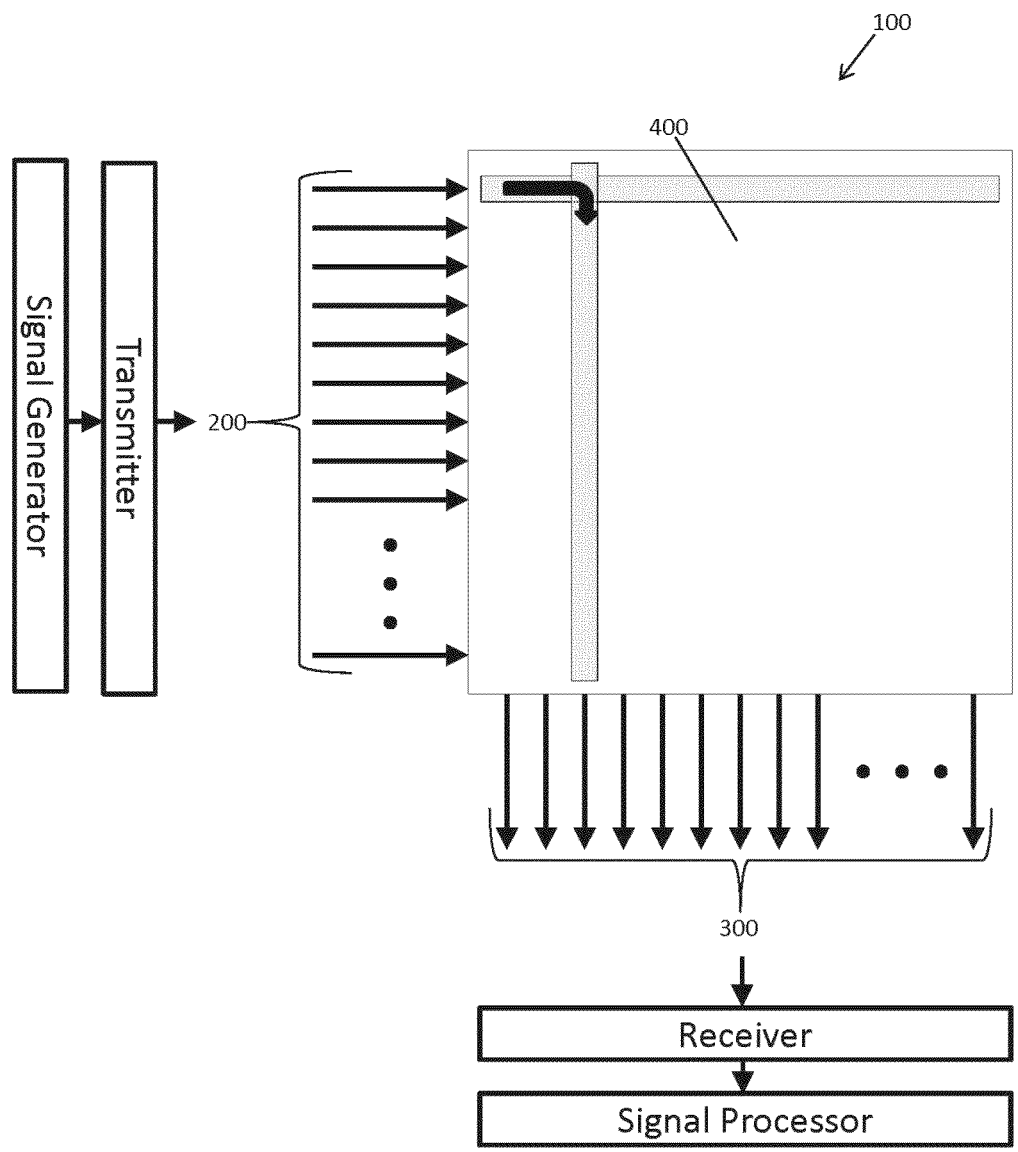
FIG. 1 provides a high level block diagram illustrating an embodiment of a low-latency touch sensor device.

This application relates to fast multi-touch sensors such as those disclosed in U.S. patent application Ser. No. 13/841,436 filed Mar. 15, 2013 entitled "Low-Latency Touch Sensitive Device," U.S. Patent Application No. 61/798,948 filed Mar. 15, 2013 entitled "Fast Multi-Touch Stylus," U.S. Patent Application No. 61/799,035 filed Mar. 15, 2013 entitled "Fast Multi-Touch Sensor With User-Identification Techniques," U.S. Patent Application No. 61/798,828 filed Mar. 15, 2013 entitled "Fast Multi-Touch Noise Reduction," U.S. Patent Application No. 61/798,708 filed Mar. 15, 2013 entitled "Active Optical Stylus," U.S. Patent Application No. 61/798,948 filed Mar. 15, 2013 entitled "Fast Multi-Touch Stylus," U.S. Patent Application No. 61/845,892 filed Jul. 12, 2013 entitled "Fast Multi-Touch Post Processing," U.S. Patent Application No. 61/845,879 filed Jul. 12, 2013 entitled "Reducing Control Response Latency With Defined Cross-Control Behavior," U.S. Patent Application No. 61/879,245 filed Sep. 18, 2013 entitled "Systems And Methods For Providing Response To User Input Using Information About State Changes And Predicting Future User Input," and U.S. Patent Application No. 61/710,256 filed Oct. 5, 2012 entitled "Hybrid Systems And Methods For Low-Latency User Input Processing And Feedback." The entire disclosures of those applications are incorporated herein by reference.

This disclosure will first describe the operation of fast multi-touch sensors to which the present post processing may be described. The presently disclosed system and method, however, is not limited to post processing in connection with the fast multi-touch sensors described below, but rather may be applied broadly to other sensors without departing from the spirit and scope of the invention.

In an embodiment, a fast multi-touch sensor, which utilizes the post processing techniques disclosed herein, provides detection of touch events (or other gestures) from human fingers (or other objects) on a two-dimensional manifold and has the capability for a touch event, or multiple simultaneous touch events, to be detected and distinguished from each other. (As used herein, the phrase touch event includes a near touch event or any other gesture that can be identified using a sensor.) In accordance with an embodiment, touch events may be detected, processed and supplied to downstream computational processes with very low latency, e.g., on the order of ten milliseconds or less, or on the order of less than one millisecond.

In an embodiment, the disclosed fast multi-touch sensor utilizes a projected capacitive method that has been enhanced for high update rate and low latency measurements of touch events. The technique can use parallel hardware and higher frequency waveforms to gain the above advantages. Also disclosed are methods to make sensitive and robust measurements, which methods may be used on transparent display surfaces and which may permit economical manufacturing of products which employ the technique. In this regard, a "capacitive object" as used herein could be a finger, other part of the human body, a stylus, or any object to which the sensor is sensitive. The sensors and methods disclosed herein need not rely on capacitance. With respect to the optical sensor embodiment disclosed below, such embodiments utilize photon tunneling and leaking to sense a touch event, and a "capacitive object" as used herein includes any object, such as a stylus or finger, that that is compatible with such sensing. Similarly, "touch locations" and "touch sensitive device" as used herein do not require actual touching contact between a capacitive object and the disclosed sensor.

FIG. 1 illustrates certain principles of a fast multi-touch sensor 100 in accordance with an embodiment. At reference no. 200, a different signal is transmitted into each of the surface's rows. The signals are designed to be "orthogonal", i.e. separable and distinguishable from each other. At reference no. 300, a receiver is attached to each column. The receiver is designed to receive any of the transmitted signals, or an arbitrary combination of them, and to individually measure the quantity of each of the orthogonal transmitted signals present on that column. The touch surface 400 of the sensor comprises a series of rows and columns (not all shown), along which the orthogonal signals can propagate. In an embodiment, the rows and columns are designed so that, when they are not subject to a touch event, a lower or negligible amount of signal is coupled between them, whereas, when they are subject to a touch event, a higher or non-negligible amount of signal is coupled between them. (In an embodiment, the opposite could hold—having the lesser amount of signal represent a touch event, and the greater amount of signal represent a lack of touch.) As discussed above, the touch, or touch event does not require a physical touching, but rather an event that affects the level of coupled signal.

With continued reference to FIG. 1, in an embodiment, generally, the capacitive result of a touch event in the proximity of both a row and column may cause a non-negligible amount of signal present on the row to be coupled to the column. More generally, touch events cause, and thus correspond to, the received signals on the columns. Because the signals on the rows are orthogonal, multiple row signals can be coupled to a column and distinguished by the receiver. Likewise, the signals on each row can be coupled to multiple columns. For each column coupled to a given row, the signals found on the column contain information that will indicate which rows are being touched simultaneously with that column. The quantity of each signal received is generally related to the amount of coupling between the column and the row carrying the corresponding signal, and thus, may indicate a distance of the touching object to the surface, an area of the surface covered by the touch and/or the pressure of the touch.

When a row and column are touched simultaneously, some of the signal that is present on the row is coupled into the corresponding column. (As discussed above, the term touch or touched does not require actual physical contact, but rather, relative proximity.) Indeed, in various implementations of a touch device, physical contact with the rows and/or columns is unlikely as there may be a protective barrier between the rows and/or columns and the finger or other object of touch. Moreover, generally, the rows and columns themselves are not in touch with each other, but rather, placed in a proximity that prevents more than a negligible amount of signal to be coupled there-between. Generally, the row-column coupling results not from actual contact between them, nor by actual contact from the finger or other object of touch, but rather, by the capacitive effect of bringing the finger (or other object) into close proximity—which close proximity resulting in capacitive effect is referred to herein as touch.)

The nature of the rows and columns is arbitrary and the particular orientation is irrelevant. Indeed, the terms row and column are not intended to refer to a square grid, but rather to a set of conductors upon which signal is transmitted (rows) and a set of conductors onto which signal may be coupled (columns). It is not even necessary that the rows and columns be in a grid at all. Other shapes are possible as long as a touch event will touch part of a "row" and part of a "column", and cause some form of coupling. For example, the "rows" could be in concentric circles and the "columns" could be spokes radiating out from the center. Moreover, it is not necessary for there to be only two types signal propagation channels: instead of rows and columns, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. Many alternative embodiments are possible and will be apparent to a person of skill in the art after considering this disclosure.

As noted above, in an embodiment the touch surface 400 comprises of a series of rows and columns, along which signals can propagate. As discussed above, the rows and columns are designed so that, when they are not being touched, a negligible amount of signal is coupled between them. Moreover, a different signal is transmitted into each of the rows. In an embodiment, each of these different signals are orthogonal (i.e. separable and distinguishable) from one another. When a row and column are touched simultaneously, a non-negligible amount of the signal that is present on the row is coupled into the corresponding column. The quantity of the signal that is coupled onto a column may be related to the pressure or area of touch.

A receiver 300 is attached to each column. The receiver is designed to receive non-negligible amounts of any of the orthogonal signals, or an arbitrary combination of the orthogonal signals, and to identify the columns providing non-negligible amounts of signal. In an embodiment, the receiver may measure the quantity of each of the orthogonal transmitted signals present on that column. In this manner, in addition to identifying the rows in touch with each column, the receiver can provide additional (e.g., qualitative) information concerning the touch. In general, touch events may correspond to the received signals on the columns. For each column, the different signals received thereon indicate which of the corresponding rows is being touched simultaneously with that column. In an embodiment, the non-negligible quantity of each signal received may be related to the amount of coupling between the corresponding row and column and may indicate the area of the surface covered by the touch, the pressure of the touch, etc.

Simple Sinusoid Embodiment

In an embodiment, the orthogonal signals being transmitted into the rows may be unmodulated sinusoids, each having a different frequency, the frequencies being chosen so that they can be easily distinguished from each other in the receiver. In an embodiment, frequencies are selected to provide sufficient spacing between them such that they can be easily distinguished from each other in the receiver. In an embodiment, no simple harmonic relationships exist between the selected frequencies. The lack of simple harmonic relationships may mitigate non-linear artifacts that can cause one signal to mimic another.

Generally, a "comb" of frequencies, where the spacing between adjacent frequencies is constant, and the highest frequency is less than twice the lowest, will meet these criteria if the spacing between frequencies, $\Delta f$, is at least the reciprocal of the measurement period $\tau$. For example, if it is desired to measure a combination of signals (from a column, for example) to determine which row signals are present once per millisecond ($\tau$), then the frequency spacing ($\Delta f$) must be greater than one kilohertz (i.e., $\Delta f > 1/\tau$). According to this calculation, in an example case with only ten rows, one could use the following frequencies:

Row 1: 5.000 MHz
Row 2: 5.001 MHz
Row 3: 5.002 MHz
Row 4: 5.003 MHz
Row 5: 5.004 MHz
Row 6: 5.005 MHz
Row 7: 5.006 MHz
Row 8: 5.007 MHz
Row 9: 5.008 MHz
Row 10: 5.009 MHz

It will be apparent to one of skill in the art that frequency spacing may be substantially greater than this minimum to permit robust design. As an example, a 20 cm by 20 cm touch surface with 0.5 cm row/column spacing would require forty rows and forty columns and necessitate sinusoids at forty different frequencies. While a once per millisecond analysis rate would require only 1 KHz spacing, an arbitrarily larger spacing is utilized for a more robust implementation. The arbitrarily larger spacing is subject to the constraint that the maximum frequency should not be more than twice the lowest (i.e. $f_{max} < 2(f_{min})$). In this example, a frequency spacing of 100 kHz with the lowest frequency set at 5 MHz may be used, yielding a frequency list of 5.0 MHz, 5.1 MHz, 5.2 MHz, etc. up to 8.9 MHz.

In an embodiment, each of the sinusoids on the list may be generated by a signal generator and transmitted on a separate row by the transmitter. To identify the rows and columns that are being simultaneously touched, a receiver receives any signals present on the columns and a signal processor analyzes the signal to determine which, if any, frequencies on the list appear. In an embodiment, the identification can be supported with a frequency analysis technique (e.g., Fourier transform), or by using a filter bank.

In an embodiment, from each column's signal, the receiver can determine the strength of each frequency from the list of frequencies found in the signal on that column. In an embodiment, where the strength of a frequency is greater than some threshold, the signal processor identifies there being a touch event between the column and the row corresponding to that frequency. In an embodiment, signal strength information, which may correspond to various physical phenomena including the distance of the touch from the row/column intersection, the size of the touch object, the pressure with which the object is pressing down, the fraction of row/column intersection that is being touched, etc. may be used as an aid to localize the area of the touch event.

Once the signals strengths have been calculated for at least two frequencies (corresponding to rows) or for at least two columns, a two-dimensional map can be created, with the signal strength being the value of the map at that row/column intersection. In an embodiment, the signals' strengths are calculated for each frequency on each column. Once signal strengths are calculated a two-dimensional map may be created. In an embodiment, the signal strength is the value of the map at that row/column intersection. In an embodiment, due to physical differences in the touch surface at different frequencies, the signal strengths need to be normalized for a given touch or calibrated. Similarly, in an embodiment, due to physical differences across the touch surface or between the intersections, the signal strengths need to be normalized for a given touch or calibrated.

In an embodiment, the two-dimensional map data may be thresholded to better identify, determine or isolate touch events. In an embodiment, the two-dimensional map data may be used to infer information about the shape, orientation, etc. of the object touching the surface.

Returning to the discussion of the signals being transmitted on the rows, a sinusoid is not the only orthogonal signal that can be used in the configuration described above. Indeed, as discussed above, any set of signals that can be distinguished from each other will work. Nonetheless, sinusoids may have some advantageous properties that may permit simpler engineering and more cost efficient manufacture of devices which use this technique. For example, sinusoids have a very narrow frequency profile (by definition), and need not extend down to low frequencies, near DC. Moreover, sinusoids can be relatively unaffected by 1/f noise, which noise could affect broader signals that extend to lower frequencies.

In an embodiment, sinusoids may be detected by a filter bank. In an embodiment, sinusoids may be detected by frequency analysis techniques (e.g., Fourier transform). Frequency analysis techniques may be implemented in a relatively efficient manner and may tend to have good dynamic range characteristics, allowing them to detect and distinguish between a large number of simultaneous sinusoids. In broad signal processing terms, the receiver's decoding of multiple sinusoids may be thought of as a form of frequency-division multiplexing. In an embodiment, other modulation techniques such as time-division and code-division multiplexing could also be used. Time division multiplexing has good dynamic range characteristics, but typically requires that a finite time be expended transmitting into (or analyzing received signals from) the touch surface. Code division multiplexing has the same simultaneous nature as frequency-division multiplexing, but may encounter dynamic range problems and may not distinguish as easily between multiple simultaneous signals.

Modulated Sinusoid Embodiment

In an embodiment, a modulated sinusoid may be used in lieu of, in combination with and/or as an enhancement of, the sinusoid embodiment described above. The use of unmodulated sinusoids may cause radiofrequency interference to other devices near the touch surface, and thus, a device employing them might encounter problems passing regulatory testing (e.g., FCC, CE). In addition, the use of unmodulated sinusoids may be susceptible to interference from other sinusoids in the environment, whether from deliberate transmitters or from other interfering devices (perhaps even another identical touch surface). In an embodiment, such interference may cause false or degraded touch measurements in the described device.

In an embodiment, to avoid interference, the sinusoids may be modulated or "stirred" prior to being transmitted by the transmitter in a manner that the signals can be demodulated ("unstirred") once they reach the receiver. In an embodiment, an invertible transformation (or nearly invertible transformation) may be used to modulate the signals such that the transformation can be compensated for and the signals substantially restored once they reach the receiver. As will also be apparent to one of skill in the art, signals emitted or received using a modulation technique in a touch device as described herein will be less correlated with other things, and thus, act more like mere noise, rather than appearing to be similar to, and/or being subject to interference from, other signals present in the environment.

In an embodiment, a modulation technique utilized will cause the transmitted data to appear fairly random or, at least, unusual in the environment of the device operation. Two modulation schemes are discussed below: Frequency Modulation and Direct Sequence Spread Spectrum Modulation.

Frequency Modulation

Frequency modulation of the entire set of sinusoids keeps them from appearing at the same frequencies by "smearing them out." Because regulatory testing is generally concerned with fixed frequencies, transmitted sinusoids that are frequency modulated will appear at lower amplitudes, and thus be less likely to be a concern. Because the receiver will "un-smear" any sinusoid input to it, in an equal and opposite fashion, the deliberately modulated, transmitted sinusoids can be demodulated and will thereafter appear substantially as they did prior to modulation. Any fixed frequency sinusoids that enter (e.g., interfere) from the environment, however, will be "smeared" by the "unsmearing" operation, and thus, will have a reduced or an eliminated effect on the intended signal. Accordingly, interference that might otherwise be caused to the sensor is lessened by employing frequency modulation, e.g., to a comb of frequencies that, in an embodiment, are used in the touch sensor.

In an embodiment, the entire set of sinusoids may be frequency modulated by generating them all from a single reference frequency that is, itself, modulated. For example, a set of sinusoids with 100 kHz spacing can be generated by multiplying the same 100 kHz reference frequency by different integers. In an embodiment this technique can be accomplished using phase-locked loops. To generate the first 5.0 MHz sinusoid, one could multiply the reference by 50, to generate the 5.1 MHz sinusoid, one could multiply the reference by 51, and so forth. The receiver can use the same modulated reference to perform the detection and demodulation functions.

Direct Sequence Spread Spectrum Modulation

In an embodiment, the sinusoids may be modulated by periodically inverting them on a pseudo-random (or even truly random) schedule known to both the transmitter and receiver. Thus, in an embodiment, before each sinusoid is transmitted to its corresponding row, it is passed through a selectable inverter circuit, the output of which is the input signal multiplied by +1 or −1 depending on the state of an "invert selection" input. In an embodiment, all of these "invert selection" inputs are driven from the same signal, so that the sinusoids for each row are all multiplied by either +1 or −1 at the same time. In an embodiment, the signal that drives the "invert selection" input may be a pseudorandom function that is independent of any signals or functions that might be present in the environment. The pseudorandom inversion of the sinusoids spreads them out in frequency, causing them to appear like random noise so that they interfere negligibly with any devices with which they might come in contact.

On the receiver side, the signals from the columns may be passed through selectable inverter circuits that are driven by the same pseudorandom signal as the ones on the rows. The result is that, even though the transmitted signals have been spread in frequency, they are despread before the receiver because they have been ben multiplied by either +1 or −1 twice, leaving them in, or returning them to, their unmodified state. Applying direct sequence spread spectrum modulation may spread out any interfering signals present on the columns so that they act only as noise and do not mimic any of the set of intentional sinusoids.

In an embodiment, selectable inverters can be created from a small number of simple components and/or can be implemented in transistors in a VLSI process.

Because many modulation techniques are independent of each other, in an embodiment, multiple modulation techniques could be employed at the same time, e.g. frequency modulation and direct sequence spread spectrum modulation of the sinusoid set. Although potentially more complicated to implement, such multiple modulated implementation may achieve better interference resistance.

Because it would be extremely rare to encounter a particular pseudo random modulation in the environment, it is likely that the multi-touch sensors described herein would not require a truly random modulation schedule. One exception may be where more than one touch surface with the same implementation is being touched by the same person. In such a case, it may be possible for the surfaces to interfere with each other, even if they use very complicated pseudo random schedules. Thus, in an embodiment, care is taken to design pseudo random schedules that are unlikely to conflict. In an embodiment, some true randomness may be introduced into the modulation schedule. In an embodiment, randomness is introduced by seeding the pseudo random generator from a truly random source and ensuring that it has a sufficiently long output duration (before it repeats). Such an embodiment makes it highly unlikely that two touch surfaces will ever be using the same portion of the sequence at the same time. In an embodiment, randomness is introduced by exclusive or'ing (XOR) the pseudo random sequence with a truly random sequence. The XOR function combines the entropy of its inputs, so that the entropy of its output is never less than either input.

A Low-Cost Implementation Embodiment

Touch surfaces using the previously described techniques may have a relatively high cost associated with generating and detecting sinusoids compared to other methods. Below are discussed methods of generating and detecting sinusoids that may be more cost-effective and/or be more suitable for mass production.

Sinusoid Detection

In an embodiment, sinusoids may be detected in a receiver using a complete radio receiver with a Fourier Transform detection scheme. Such detection may require digitizing a high-speed RF waveform and performing digital signal processing thereupon. Separate digitization and signal processing may be implemented for every column of the surface; this permits the signal processor to discover which of the row signals are in touch with that column. In the above-noted example, having a touch surface with forty rows and forty columns, would require forty copies of this signal chain. Today, digitization and digital signal processing are relatively expensive operations, in terms of hardware, cost, and power. It would be useful to utilize a more cost-effective method of detecting sinusoids, especially one that could be easily replicated and requires very little power.

In an embodiment, sinusoids may be detected using a filter bank. A filter bank comprises an array of bandpass filters that can take an input signal and break it up into the frequency components associated with each filter. The Discrete Fourier Transform (DFT, of which the FFT is an efficient implementation) is a form of a filter bank with evenly-spaced bandpass filters that is commonly used for frequency analysis. DFTs may be implemented digitally, but the digitization step may be expensive. It is possible to implement a filter bank out of individual filters, such as passive LC (inductor and capacitor) or RC active filters. Inductors are difficult to implement well on VLSI processes, and discrete inductors are large and expensive, so it may not be cost effective to use inductors in the filter bank.

At lower frequencies (about 10 MHz and below), it is possible to build banks of RC active filters on VLSI. Such active filters may perform well, but may also take up a lot of die space and require more power than is desirable.

At higher frequencies, it is possible to build filter banks with surface acoustic wave (SAW) filter techniques. These allow nearly arbitrary FIR filter geometries. SAW filter techniques require piezoelectric materials which are more expensive than straight CMOS VLSI. Moreover, SAW filter techniques may not allow enough simultaneous taps to integrate sufficiently many filters into a single package, thereby raising the manufacturing cost.

In an embodiment, sinusoids may be detected using an analog filter bank implemented with switched capacitor techniques on standard CMOS VLSI processes that employs an FFT-like "butterfly" topology. The die area required for such an implementation is typically a function of the square of the number of channels, meaning that a 64-channel filter bank using the same technology would require only $\frac{1}{256}$th of the die area of the 1024-channel version. In an embodiment, the complete receive system for the low-latency touch sensor is implemented on a plurality of VLSI dies, including an appropriate set of filter banks and the appropriate amplifiers, switches, energy detectors, etc. In an embodiment, the complete receive system for the low-latency touch sensor is implemented on a single VLSI die, including an appropriate set of filter banks and the appropriate amplifiers, switches, energy detectors, etc. In an embodiment, the complete receive system for the low-latency touch sensor is implemented on a single VLSI die containing n instances of an n-channel filter bank, and leaving room for the appropriate amplifiers, switches, energy detectors, etc.

Sinusoid Generation

Generating the transmit signals (e.g., sinusoids) in a low-latency touch sensor is generally less complex than detection, principally because each row requires the generation of a single signal while the column receivers have to detect and distinguish between many signals. In an embodiment, sinusoids can be generated with a series of phase-locked loops (PLLs), each of which multiply a common reference frequency by a different multiple.

In an embodiment, the low-latency touch sensor design does not require that the transmitted sinusoids are of very high quality, but rather, accommodates transmitted sinusoids that have more phase noise, frequency variation (over time, temperature, etc.), harmonic distortion and other imperfections than may usually be allowable or desirable in radio circuits. In an embodiment, the large number of frequencies may be generated by digital means and then employ a relatively coarse analog-to-digital conversion process. As discussed above, in an embodiment, the generated row frequencies should have no simple harmonic relationships with each other, any non-linearities in the described generation process should not cause one signal in the set to "alias" or mimic another.

In an embodiment, a frequency comb may be generated by having a train of narrow pulses filtered by a filter bank, each filter in the bank outputting the signals for transmission on a row. The frequency "comb" is produced by a filter bank that may be identical to a filter bank that can be used by the receiver. As an example, in an embodiment, a 10 nanosecond pulse repeated at a rate of 100 kHz is passed into the filter bank that is designed to separate a comb of frequency components starting at 5 MHz, and separated by 100 kHz. The pulse train as defined would have frequency components from 100 kHz through the tens of MHz, and thus, would have a signal for every row in the transmitter. Thus, if the pulse train were passed through an identical filter bank to the one described above to detect sinusoids in the received column signals, then the filter bank outputs will each contain a single sinusoid that can be transmitted onto a row.

Transparent Display Surface

It may be desirable that the touch surface be integrated with a computer display so that a person can interact with computer-generated graphics and imagery. While front projection can be used with opaque touch surfaces and rear projection can be used with translucent ones, modern flat panel displays (LCD, plasma, OLED, etc.) generally require that the touch surface be transparent. In an embodiment, the present technique's rows and columns, which allow signals to propagate along them, need to be conductive to those signals. In an embodiment, the present technique's rows and columns, which allow radio frequency signals to propagate along them, need to be electrically conductive.

If the rows and columns are insufficiently conductive, the resistance per unit length along the row/column will combine with the capacitance per unit length to form a low-pass filter: any high-frequency signals applied at one end will be substantially attenuated as they propagate along the poor conductor.

Visually transparent conductors are commercially available (e.g. indium-tin-oxide or ITO), but the tradeoff between transparency and conductivity is problematic at the frequencies that may be desirable for some embodiments of the low-latency touch sensor described herein: if the ITO were thick enough to support certain desirable frequencies over certain lengths, it may be insufficiently transparent for some applications. In an embodiment, the rows and/or columns may be formed entirely, or at least partially, from graphene and/or carbon nanotubes, which are both highly conductive and optically transparent.

In an embodiment, the rows and/or columns may be formed from one or more fine wires that block a negligible amount of the display behind them. In an embodiment, the fine wires are too small to see, or at least too small to present a visual impediment when viewing a display behind it. In an embodiment, fine silver wires patterned onto transparent glass or plastic can be used to make up the rows and/or columns. Such fine wires need to have sufficient cross section to create a good conductor along the row/column, but it is desirable (for rear displays) that such wires are small enough and diffuse enough to block as little of the underlying display as appropriate for the application. In an embodiment, the fine wire size is selected on the basis of the pixels size and/or pitch of the underlying display.

As an example, the new Apple Retina displays comprises about 300 pixels per inch, which yields a pixel size of about 80 microns on a side. In an embodiment, a 20 micron diameter silver wire 20 centimeters long (the length of an iPad display), which has a resistance of about 10 ohms, is used as a row and/or column and/or as part of a row and/or column in a low-latency touch sensor as described herein. Such 20 micron diameter silver wire, however, if stretched across a retina display, may block up to 25% of an entire line of pixels. Accordingly, in an embodiment, multiple thinner diameter silver wires may be employed as a column or row, which can maintain an appropriate resistance, and provide acceptable response with respect to radiofrequency skin depth issues. Such multiple thinner diameter silver wires can be laid in a pattern that is not straight, but rather, somewhat irregular. A random or irregular pattern of thinner wires is likely to be less visually intrusive. In an embodiment, a mesh of thin wires is used; the use of a mesh will improve robustness, including against manufacturing flaws in patterning. In an embodiment, single thinner diameter wires may be employed as a column or row, provided that the thinner wire is sufficiently conductive to maintain an appropriate level resistance, and acceptable response with respect to radiofrequency skin depth issues.

Figure 2:
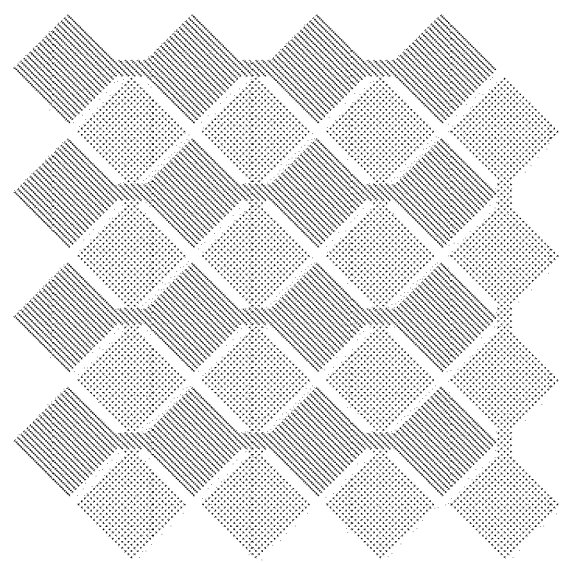
FIG. 2 illustrates an embodiment of a layout for crossing conductive paths that can be used in an embodiment of a low-latency touch sensor device.

FIG. 2 illustrates an embodiment of a row/column touch surface that has a diamond-shaped row/column mesh. This mesh pattern is designed to provide maximal and equal surface area to the rows and columns while permitting minimal overlap between them.

A touch event with an area greater than one of the diamonds will cover at least part of a row and a column, which will permit some coupling of a row signal into the overlapped column. In an embodiment, the diamonds are sized to be smaller than the touching implement (finger, stylus, etc.). In an embodiment, a 0.5 cm spacing between rows and columns performs well for human fingers.

In an embodiment a simple grid of wires is employed as the rows and columns. Such a grid would provide less surface area for the rows and columns, but can suffice for radio frequency signals, and provide a sufficient non-negligible coupling which can be detected by a receiver.

In an embodiment, the "diamond patterns" for the rows and columns, as shown in FIG. 2, can be created by using a randomly connected mesh of thin wires that fills the space of the indicated shapes, or by combining wire mesh and an another transparent conductor such as ITO. In an embodiment, thin wires may be used for long stretches of conductivity, e.g., across the entire screen, and ITO may be used for local areas of conductivity, such as the diamond-shaped areas.

An Optical Embodiment

While radiofrequency and electrical methods of implementing the described fast multi-touch technique have been discussed above, other media can be employed as well. For example, the signals can be optical signals (i.e., light), having waveguides or other means for the rows and columns. In an embodiment, the light, used for the optical signals may be in the visible region, the infrared and/or the ultraviolet.

In an embodiment, instead of electrically conductive rows and columns that carry radiofrequency signals, the rows and columns could comprise optical waveguides, such as optical fiber, fed by one or more light sources that generate orthogonal signals and are coupled to the waveguides by an optical coupler. For example, a different distinct wavelength of light could be injected into each row fiber. When a human finger touches a row fiber, some of the light in it will leak (i.e., couple) into the finger, due to frustrated total internal reflection. Light from the finger may then enter one of the column fibers, due to the reciprocal process, and propagate to a detector at the end of the fiber.

In an embodiment, optical signals may be generated with LEDs of different wavelengths, or by using optical filters. In an embodiment, custom interference filters are employed. In an embodiment, the different wavelengths of light present on the fiber columns can be detected using optical filter banks. In an embodiment, such optical filter banks may be implemented using custom interference filters. In an embodiment, wavelengths of light outside the visible spectrum (e.g., infrared and/or ultraviolet light) may be used to avoid adding extra visible light to the display.

In an embodiment, the row and column fibers may be woven together so that a finger can touch them simultaneously. In an embodiment, the woven construction may be made as visually transparent as needed to avoid obscuring the display.

Fast Multi-Touch Post Processing

After the signal strengths from each row in each column have been calculated using, for example, the procedures described above, post-processing is performed to convert the resulting 2-D "heat map" into usable touch events. In an embodiment, such post processing includes at least some of the following four procedures: field flattening, touch point detection, interpolation and touch point matching between frames. The field flattening procedure subtracts an offset level to remove crosstalk between rows and columns, and compensates for differences in amplitude between particular row/column combinations due to attenuation. The touch point detection procedure computes the coarse touch points by finding local maxima in the flattened signal. The interpolation procedure computes the fine touch points by fitting data associated with the coarse touch points to a paraboloid. The frame matching procedure matches the calculated touch points to each other across frames. Below, each of the four procedures is described in turn. Also disclosed are examples of implementation, possible failure modes, and consequences, for each processing step. Because of the requirement for very low latency, the processing steps should be optimized and parallelized.

We first describe the field flattening procedure. Systematic issues due to the design of the touch surface and sensor electronics may cause artifacts in each column's received signal strength. These artifacts can be compensated-for as follows. First, because of cross-talk between the rows and columns, the received signal strength for each row/column combination will experience an offset level. To a good approximation, this offset level will be constant and can be subtracted off.

Second, the amplitude of the signal received at a column due to a calibrated touch at a given row and column intersection will depend on that particular row and column, mostly due to attenuation of the signals as they propagate along the row and column. The farther they travel, the more attenuation there will be, so columns farther from the transmitters and rows farther from the receivers will have lower signal strengths in the "heat map" than their counterparts. If the RF attenuation of the rows and columns is low, the signal strength differences may be negligible and little or no compensation will be necessary. If the attenuation is high, compensation may be necessary or may improve the sensitivity or quality of touch detection. Generally, the signal strengths measured at the receivers are expected to be linear with the amount of signal transmitted into the columns. Thus, in an embodiment, compensation will involve multiplying each location in the heat map by a calibration constant for that particular row/column combination. In an embodiment, measurements or estimates may be used to determine a heat map compensation table, which table can be similarly used to provide the compensation by multiplication. In an embodiment, a calibration operation is used to create a heat map compensation table. The term "heat map" as used herein need not require an actual map of heat, but rather the term can mean any array of at least two dimensions comprising data corresponding to locations.

In an exemplary embodiment, the entire field flattening procedure is as follows. With nothing touching the surface, first measure the signal strength for each row signal at each column receiver. Because there are no touches, substantially the entire signal received is due to cross-talk. The value measured (e.g., the amount of each row's signal found on each column) is an offset level that needs to be subtracted from that position in the heat map. Then, with the constant offsets subtracted, place a calibrated touch object at each row/column intersection and measure the signal strength of that row's signal at that column receiver. The signal processor may be configured to normalize the touch events to the value of one location on the touch surface. We can arbitrarily choose the location likely to have the strongest signals (because it experiences the least attenuation), i.e. the row/column intersection closest to the transmitters and receivers. If the calibrated touch signal strength at this location is $S_N$ and the calibrated touch signal strength for each row and column is $S_{R,C}$ then, if we multiply each location in the heat map by $(S_N/S_{R,C})$, then all touch values will be normalized. For calibrated touches, the normalized signal strength for any row/column in the heat map will be equal to one.

Figure 3:
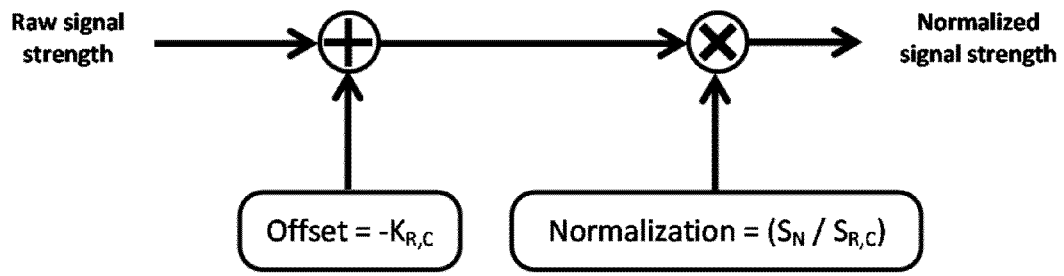
FIG. 3 shows a block diagram illustrating a field flattening procedure.

The field flattening procedure parallelizes well. Once the offsets and normalization parameters are measured and stored—which should only need to be done once (or possibly again at a maintenance interval)—the corrections can be applied as soon as each signal strength is measured. FIG. 3 illustrates an embodiment of a field flattening procedure.

In an embodiment, calibrating each row/column intersection may be required at regular or selected maintenance intervals. In an embodiment, calibrating each row/column intersection may be required once per unit. In an embodiment, calibrating each row/column intersection may be required once per design. In an embodiment, and particularly where, e.g., RF attenuation of the rows and columns is low, calibrating each row/column intersection may not be required at all. Moreover, in an embodiment where the signal attenuation along the rows and columns is fairly predictable, it may be possible to calibrate an entire surface from only a few intersection measurements.

If a touch surface does experience a lot of attenuation, the field flattening procedure will, at least to some degree, normalize the measurements, but it may have some side effects. For example, the noise on each measurement will grow as its normalization constant gets larger. It will be apparent to one of skill in the art, that for lower signal strengths and higher attenuations, this may cause errors and instability in the touch point detection and interpolation processes. Accordingly, in an embodiment, care is taken to provide sufficient signal strength for the largest attenuation (e.g., the farthest row/column intersection).

We now turn to touch point detection. Once the heat map is generated and the field flattened, one or more coarse touch points can be identified. Identifying the one or more coarse touch points is done by finding local maxima in the normalized (i.e., flattened) signal strengths. A fast and parallelizable method for finding the one or more touch points involves comparing each element of the normalized heat map to its neighbors and label it a local maximum if it is strictly greater than all of them. In an embodiment, a point is identified as a local maximum if it is both strictly greater than all of its neighbors and above a given threshold.

It is within the scope of this disclosure to define the set of neighbors in various ways. In an embodiment, the nearest neighbors are defined by a Von Neumann neighborhood. In an embodiment, the nearest neighbors are defined by a Moore neighborhood. The Von Neumann neighborhood may consists of the four elements that are vertically and horizontally adjacent to the element in the center (i.e. the elements to the north, south, east and west of it). This is also called a "four-connected" neighborhood. More complex (i.e., larger) Von Neumann neighborhoods are also applicable and may be used. The Moore neighborhood consists of the eight elements that are vertically, horizontally and diagonally adjacent to the element in the center (i.e. the elements to the north, south, east, west, northeast, northwest, southeast and southwest of it). This is also called the "eight-connected" neighborhood.

The neighborhood chosen will depend on the interpolation scheme used to calculate the fine touch points. This is illustrated in further detail below.

In a given neighbor comparison, a special case may exists where an element's normalized signal strength is equal to one or more of its neighbors, strictly, or within a tolerance to allow for noise levels. In an embodiment, neither point in such pairs is considered to be a touch point even if they have values above the threshold. In an embodiment, both points in such pairs are considered to be touch points. In an embodiment, regions where two or more neighboring points have approximately the same value are treated as one touch event. In an embodiment, regions where two or more neighboring points have approximately the same value are treated as a different type of touch event (e.g., perhaps someone has their wrist in contact with the touch surface) from the regions where a single local maxima can be found.

Turning now to the interpolation procedure. Once the coarse touch points have been determined (i.e., identified), fine touch points can be computed using interpolation. In an embodiment, the capacitive contact of a distributed touch is fit to a model function having a maximum. In an embodiment, the model function is a second-order function in two or more dimensions. In an embodiment, the second-order function is a paraboloid. In an embodiment, the paraboloid model is an acceptable approximation for a variety of objects that may be used to touch a touch surface, such as a finger or stylus. Moreover, as discussed below, the paraboloid model is relatively non-intensive computationally. In an embodiment, a more complex or more computationally intensive model may be used to provide more accurate estimation of the touch from the flattened heat map. For the purposes of the discussion below, the paraboloid is used as an illustrative example, but as will be apparent to one of skill in the art, other models, including models of greater or lesser complexity may be employed for the purpose of interpolation.

Figure 4:
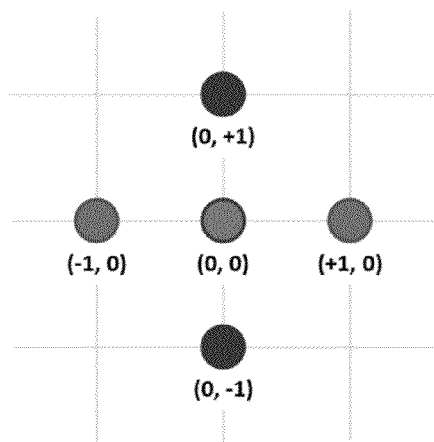
FIG. 4 shows a diagram illustrating a four-connected neighborhood around a local maximum.

FIG. 4 illustrates a Von Neumann neighborhood around an exemplary local maximum. For such a four-connected, or Von Neumann, neighborhood, the relevant points would look like those shown, with the central element being the local maximum and the subscripts being the coordinates of a particular element relative to it. The positions and signal strengths of the five elements allow us to fit them to the following equation defining a paraboloid:

$$Ax^2 + Cy^2 + Dx + Ey + F = z$$

Where x and y are the position of an element, z is the signal strength of the element, and A, C, D, E and F are the coefficients of the second-order polynomial. Relative to the central point, all of element x, y positions are constant. The z values are the measured signal strengths at each element, and thus are known. In an embodiment, five simultaneous equations can be used to solve for the five unknown polynomial coefficients. Each equation represents one of the five points, including the central point and its four neighbors.

In an embodiment, a Vandermonde-like matrix can be employed to solve for the polynomial coefficients, as follows:

$$\begin{bmatrix} x_{0,1}^2 & y_{0,1}^2 & x_{0,1} & y_{0,1} & 1 \\ x_{-1,0}^2 & y_{-1,0}^2 & x_{-1,0} & y_{-1,0} & 1 \\ x_{0,0}^2 & y_{0,0}^2 & x_{0,0} & y_{0,0} & 1 \\ x_{1,0}^2 & y_{1,0}^2 & x_{1,0} & y_{1,0} & 1 \\ x_{0,-1}^2 & y_{0,-1}^2 & x_{0,-1} & y_{0,-1} & 1 \end{bmatrix} \begin{bmatrix} A \\ C \\ D \\ E \\ F \end{bmatrix} = \begin{bmatrix} z_{0,1} \\ z_{-1,0} \\ z_{0,0} \\ z_{1,0} \\ z_{0,-1} \end{bmatrix}$$

Substituting in the values for the element positions, we get:

$$\begin{bmatrix} 0 & 1 & 0 & 1 & 1 \\ 1 & 0 & -1 & 0 & 1 \\ 0 & 0 & 0 & 0 & 1 \\ 1 & 0 & 1 & 0 & 1 \\ 0 & 1 & 0 & -1 & 1 \end{bmatrix} \begin{bmatrix} A \\ C \\ D \\ E \\ F \end{bmatrix} = \begin{bmatrix} z_{0,1} \\ z_{-1,0} \\ z_{0,0} \\ z_{1,0} \\ z_{0,-1} \end{bmatrix}$$

And then solve for the polynomial coefficients by inverting the constant Vandermonde-like matrix:

$$\begin{bmatrix} 0 & 1 & 0 & 1 & 1 \\ 1 & 0 & -1 & 0 & 1 \\ 0 & 0 & 0 & 0 & 1 \\ 1 & 0 & 1 & 0 & 1 \\ 0 & 1 & 0 & -1 & 1 \end{bmatrix}^{-1} = \frac{1}{2} \begin{bmatrix} 0 & 1 & -2 & 1 & 0 \\ 1 & 0 & -2 & 0 & 1 \\ 0 & -1 & 0 & 1 & 0 \\ 1 & 0 & 0 & 0 & -1 \\ 0 & 0 & 2 & 0 & 0 \end{bmatrix}$$

This yields:

$$\begin{bmatrix} A \\ C \\ D \\ E \\ F \end{bmatrix} = \frac{1}{2} \begin{bmatrix} 0 & 1 & -2 & 1 & 0 \\ 1 & 0 & -2 & 0 & 1 \\ 0 & -1 & 0 & 1 & 0 \\ 1 & 0 & 0 & 0 & -1 \\ 0 & 0 & 2 & 0 & 0 \end{bmatrix} \begin{bmatrix} z_{0,1} \\ z_{-1,0} \\ z_{0,0} \\ z_{1,0} \\ z_{0,-1} \end{bmatrix}$$

In an embodiment, the polynomial coefficients are a linear combination of the signal strengths and only simple multiplication, involving negation and a single shift, are required to calculate them; accordingly, they can be efficiently computed in an FPGA or ASIC.

At the maximum of the paraboloid, both partial derivatives are zero:

$$\frac{\partial x}{\partial z} = 2Ax + D = 0$$

and $$\frac{\partial y}{\partial z} = 2Cy + E = 0$$

This will occur at the point $x_f$, $y_f$ where:

$$x_f = -\frac{D}{2A}$$

and $$y_f = -\frac{E}{2C}$$

Thus, in an embodiment where the neighborhood data is fit to a paraboloid, and because a paraboloid has one maximum, that maximum is used as a location of the fine touch point. In an embodiment utilizing the four-connected neighborhood, the values $x_f$ and $y_f$ are independent of each other, with $x_f$ depending only on the signal strengths of the elements to the left and right of the center point, and $y_f$ depending only on the signal strengths of the elements above and below it.

Figure 5:
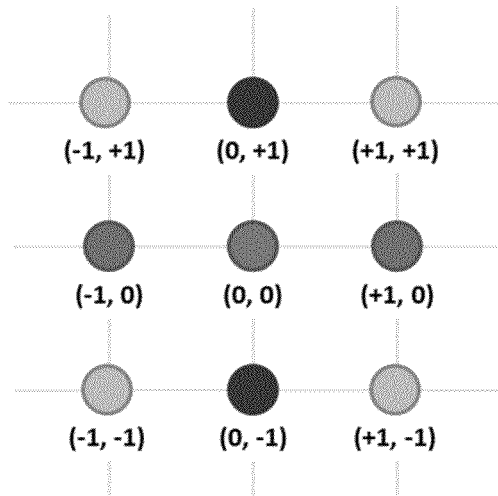
FIG. 5 shows a diagram illustrating an eight-connected neighborhood around a local maximum.

FIG. 5 illustrates a Moore or eight-connected neighborhood around a local maximum. For such an eight-connected, or Moore, neighborhood, the relevant points would appear as shown, with the central element being the local maximum and the subscripts being the coordinates of a particular element relative to it. The positions and signal strengths of the nine elements can be fit to a paraboloid equation. Because more input data is available in this example than the previous example, a somewhat more complex equation for a paraboloid can be employed:

$$Ax^2 + Bxy + Cy^2 + Dx + Ey + F = z$$

This equation has an added xy cross term and a new B coefficient that permits the model to compensate for elongation in a direction other than x or y. Again, relative to the central point, all of the element x, y positions are constant and the z values are known. Nine simultaneous equations (one per element) can be used to determine (i.e., overdetermine) the six unknown polynomial coefficients. A least-squares technique may be used to solve for the six unknown polynomial coefficients.

A Vandermonde-like matrix may be used to fit the polynomial. Unlike the embodiment described above, the matrix is non-square, with nine rows and six columns.

$$\begin{bmatrix} x_{-1,1}^2 & xy_{-1,1} & y_{-1,1}^2 & x_{-1,1} & y_{-1,1} & 1 \\ x_{0,1}^2 & xy_{0,1} & y_{0,1}^2 & x_{0,1} & y_{0,1} & 1 \\ x_{1,1}^2 & xy_{1,1} & y_{1,1}^2 & x_{1,1} & y_{1,1} & 1 \\ x_{-1,0}^2 & xy_{-1,0} & y_{-1,0}^2 & x_{-1,0} & y_{-1,0} & 1 \\ x_{0,0}^2 & xy_{0,0} & y_{0,0}^2 & x_{0,0} & y_{0,0} & 1 \\ x_{1,0}^2 & xy_{1,0} & y_{1,0}^2 & x_{1,0} & y_{1,0} & 1 \\ x_{-1,-1}^2 & xy_{-1,-1} & y_{-1,-1}^2 & x_{-1,-1} & y_{-1,-1} & 1 \\ x_{0,-1}^2 & xy_{0,-1} & y_{0,-1}^2 & x_{0,-1} & y_{0,-1} & 1 \\ x_{1,-1}^2 & xy_{1,-1} & y_{1,-1}^2 & x_{1,-1} & y_{1,-1} & 1 \end{bmatrix} \begin{bmatrix} A \\ B \\ C \\ D \\ E \\ F \end{bmatrix} = \begin{bmatrix} z_{-1,1} \\ z_{0,1} \\ z_{1,1} \\ z_{-1,0} \\ z_{0,0} \\ z_{1,0} \\ z_{-1,-1} \\ z_{0,-1} \\ z_{1,-1} \end{bmatrix}$$

All of the entires in the Vandermonde-like matrix are constant, and the z values are known so, substituting in the constant values, yields $$\begin{bmatrix} 1 & 1 & 1 & -1 & -1 & 1 \\ 0 & 0 & 1 & 0 & -1 & 1 \\ 1 & -1 & 1 & 1 & -1 & 1 \\ 1 & 0 & 0 & -1 & 0 & 1 \\ 0 & 0 & 0 & 0 & 0 & 1 \\ 1 & 0 & 0 & 1 & 0 & 1 \\ 1 & -1 & 1 & -1 & 1 & 1 \\ 0 & 0 & 1 & 0 & 1 & 1 \\ 1 & 1 & 1 & 1 & 1 & 1 \end{bmatrix} \begin{bmatrix} A \\ B \\ C \\ D \\ E \\ F \end{bmatrix} = \begin{bmatrix} z_{-1,1} \\ z_{0,1} \\ z_{1,1} \\ z_{-1,0} \\ z_{0,0} \\ z_{1,0} \\ z_{-1,-1} \\ z_{0,-1} \\ z_{1,-1} \end{bmatrix}$$

Because the Vandermonde-like matrix is non-square, it cannot be inverted to solve for the polynomial coefficients. It can be solved, however, using its Moore-Penrose pseudo-inverse and performing a least squares fit to the polynomial coefficients. In an embodiment, the pseudo inverse is defined as:

$$pinv(X) = (X^T X)^{-1} X^T$$

$$pinv \begin{bmatrix} 1 & 1 & 1 & -1 & -1 & 1 \\ 0 & 0 & 1 & 0 & -1 & 1 \\ 1 & -1 & 1 & 1 & -1 & 1 \\ 1 & 0 & 0 & -1 & 0 & 1 \\ 0 & 0 & 0 & 0 & 0 & 1 \\ 1 & 0 & 0 & 1 & 0 & 1 \\ 1 & -1 & 1 & -1 & 1 & 1 \\ 0 & 0 & 1 & 0 & 1 & 1 \\ 1 & 1 & 1 & 1 & 1 & 1 \end{bmatrix} =$$

$$\frac{1}{36} \begin{bmatrix} 6 & -12 & 6 & 6 & -12 & 6 & 6 & -12 & 6 \\ -9 & 0 & 9 & 0 & 0 & 0 & 9 & 0 & -9 \\ 6 & 6 & 6 & -12 & -12 & -12 & 6 & 6 & 6 \\ -6 & 0 & 6 & -6 & 0 & 6 & -6 & 0 & 6 \\ 6 & 6 & 6 & 0 & 0 & 0 & -6 & -6 & -6 \\ -4 & 8 & -4 & 8 & 20 & 8 & -4 & 8 & -4 \end{bmatrix}$$

giving:

$$\begin{bmatrix} A \\ B \\ C \\ D \\ E \\ F \end{bmatrix} = \frac{1}{36} \begin{bmatrix} 6 & -12 & 6 & 6 & -12 & 6 & 6 & -12 & 6 \\ -9 & 0 & 9 & 0 & 0 & 0 & 9 & 0 & -9 \\ 6 & 6 & 6 & -12 & -12 & -12 & 6 & 6 & 6 \\ -6 & 0 & 6 & -6 & 0 & 6 & -6 & 0 & 6 \\ 6 & 6 & 6 & 0 & 0 & 0 & -6 & -6 & -6 \\ -4 & 8 & -4 & 8 & 20 & 8 & -4 & 8 & -4 \end{bmatrix} \begin{bmatrix} z_{-1,1} \\ z_{0,1} \\ z_{1,1} \\ z_{-1,0} \\ z_{0,0} \\ z_{1,0} \\ z_{-1,-1} \\ z_{0,-1} \\ z_{1,-1} \end{bmatrix}$$

The polynomial coefficients are a linear combination of the signal strengths. The multiplications are slightly more complicated, but many of the multiplicands can be factored out and applied a single time near the end of the calculation. The purpose of this step is to find the maximum of a paraboloid. Accordingly, overall scale factors are irrelevant, and focus need only be on relative values and arguments which maximize the function, in an embodiment, many of the operations may be able to cancel out, improving the efficiency of implementation.

As above, the fine touch point is presumed at the maximum of the paraboloid, where both partial derivatives are zero:

$$\frac{\partial x}{\partial z} = 2Ax + By + D = 0$$

and $$\frac{\partial y}{\partial z} = Bx + 2Cy + E = 0$$

This will occur at the point $x_f$, $y_f$ where:

$$x_f = (BE - 2CD)/(4AC - B^2)$$

and $$y_f = (DB - 2AE)/(4AC - B^2)$$

For the eight-connected neighborhood, the values $x_f$ and $y_f$ are not independent of each other. Both depend on the signal strengths of all eight neighbors. Thus, this approach may have an increased computational burden and the possibility that certain combinations of signal strengths will produce singular values for the fine touch points. In an embodiment using the least-squares approach on the eight Moore neighbors, such an implementation is more robust against noisy signal strength values. In other words, in an embodiment, small errors in one signal strength will be compensated for by the increased amount of data used in the calculation, and the self-consistency of that data.

Moreover, the eight-connected neighborhood provides a B coefficient—an extra piece of information—that might prove useful as part of a user interface. The B coefficient of the xy cross-term can be used to characterize asymmetry in the fitted paraboloid and, along with the aspect ratio information inherent in the A and C coefficients, which could allow software to determine the angle at which a touch is occurring.

Figure 6:
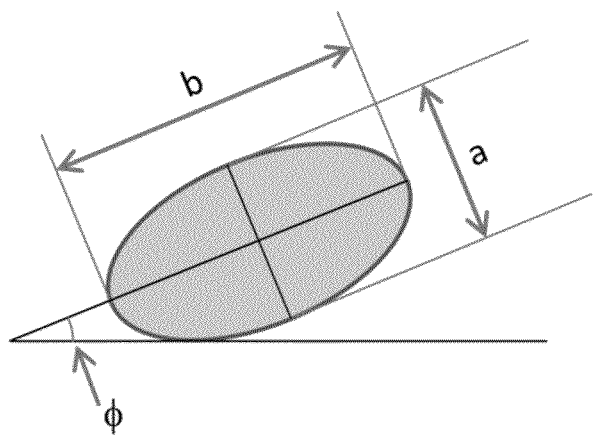
FIG. 6 shows a geometric view illustrating an elliptical fit to an asymmetric touch point.

FIG. 6 shows an example touch point with an elliptical cross section, which could be obtained by truncating the paraboloid at a particular z value. The values of a and b can be obtained from the A and C coefficients of the polynomial, and they provide information about the aspect ratio of the object touching the surface. For example, a finger or stylus would not necessarily be circularly symmetric, and the ratio of a to b could provide information about its shape.

Knowledge of the angle $\phi$ can provide information on the orientation of the ellipse, and might, for example, indicate which way a finger or stylus is pointing. $\phi$ can be calculated from the eigenvalues and eignevectors of the 2×2 matrix M given by the following:

$$M = \begin{bmatrix} A & B/2 \\ B/2 & C \end{bmatrix}$$

This matrix will have two eignevalues and two eigenvectors. The eigevector associated with the largest eigenvalue will point in the direction of the ellipse's major axis. The other eigenvector will point in the direction of the minor axis. The eigenvalues, $\lambda_1$ and $\lambda_2$ can be computed as follows:

$$\lambda_i = \frac{tr(M) \pm \sqrt{tr(M)^2 - 4\det(M)}}{2}$$

Where tr(M) is the trace of the matrix M, which is equal to AC, and det(M) is the determinant of the matrix M, which is equal to $AC - B^2/4$.

Once the eigenvalues are obtained, we can use the Cayley-Hamilton theorem to compute the eigenvectors. The eigenvector associated with $\lambda_1$ is either of the columns of the matrix $M - \lambda_2 I$ and the eigenvector associated with $\lambda_2$ is either of the columns of the matrix $M - \lambda_1 I$. Note the reversal of the eigenvalue indexes. The angle $\phi$ that the major axis of the ellipse makes with respect to the x axis of our coordinate system is the arctangent of the slope of the eigenvector. The slope of the eigenvector is just $\Delta y/\Delta x$.

As discussed above, the interpolation step requires determining a fine touch point, e.g., using data acquired from a flattened heat map, but is not limited to the illustrative paraboloid model discussed above. The purpose of determining a fine touch point is to permit the post-processor to provide better granularity in touch points, and specifically, to provide granularity that exceeds the sensor's intersections. Stated another way, the modeled and interpolated fine touch point can land directly on a row/column intersection, or anywhere in between the intersections. There may be a tradeoff between the accuracy of the model and its computational requirements; similarly, there may be a tradeoff between the accuracy of the model and its ability to provide an interpolated fine touch point that corresponds with the actual touch. Thus, in an embodiment, a model is selected to require the smallest computational load while providing sufficient correspondence between the interpolated touch point and the actual touch. In an embodiment, a model is selected to require sufficient correspondence between the interpolated touch point and the actual touch, and the processing hardware is selected to accommodate the computational load of the model. In an embodiment, a model is selected that does not exceed the computational capacity of pre-selected hardware and/or other software operating the touch interface.

Turn to the frame matching procedure. To properly track objects moving on the touch surface over time, it is important to match the calculated touch points to each other across frame boundaries, and thus, e.g., to track objects moving on the touch surface as they move. Stated another way, each calculated touch point in one frame should be identified in, or have another disposition (e.g., removed) in, the subsequent frame. While this is a fundamentally difficult problem, which may be insoluble in the general case, an embodiment can be implemented using both geometry and the laws of physics. Because the items that are in contact with the touch surface are of finite size and move according to certain physical principles, certain cases can be ignored as being outside of plausible ranges. Moreover, in an embodiment, the frame rate should be sufficient to permit object tracking (that is, frame-to-frame touch point tracking) with reasonable certainty. Thus, for example, where objects to be tracked are either known to move at a maximum rate across the touch surface or the tracking is designed to track the objects only up to a maximum rate, a frame rate can be selected that will permit tracking with reasonable certainty. For example, if a maximum rate of movement across the rows or columns of the touch surface is, e.g., 1000 rows or columns per second, then a frame rate of 1000 Hz will "see" an object move no more than 1 row or column per frame. In an embodiment, touch point interpolation (as discussed above) can provide a more precise measure of the touch point location, and thus, intra-row and intra-column positions are readily identifiable as described more fully herein.

Fingers and styluses have a minimum size and are unlikely to approach each other closely enough to cause an ambiguous case. They also travel at speeds characteristic of the motion of a human arm and its parts (e.g., wrist, elbow, fingers, etc.), which bounds the problem. Because the touch surface of the presently disclosed sensor has a relatively high update rate, which, in an embodiment, may be on the order of one kilohertz or more, fingers and styluses touching the surface cannot move very far or at extreme angles during the update period from one frame to the next. Because of the limited distances and angles, tracking can be somewhat simplified according to the present disclosure.

In an embodiment, tracking of objects moving on the touch surface over time is performed by comparing data from one frame to one or more past frames. In an embodiment, data concerning past frames (e.g., a heat map) may be maintained in a temporary buffer. In an embodiment, processed data concerning past frames (e.g., field flattened heat map or fitted polynomial coefficients) may be maintained in a temporary buffer. In an embodiment, the data concerning a past frame that is maintained in a temporary buffer may include, or may consist of, an interpolated fine touch point coordinate for each fine touch point in the prior frame, and, to the extent such exists, vectors concerning prior motion of those fine touch points. The temporary buffer may retain data concerning one or more past frames, and may cease to retain the data when it is no longer relevant to later calculations.

In an embodiment, the frame matching process initially presumes that an object's touch point in the current frame i is probably the touch point in the prior frame (i.e., i−1) which is geometrically closest to it.

In an embodiment, data concerning the motion of a touch point (e.g., velocity and direction) are determined and stored in connection with one or more frames. In an embodiment, data concerning the motion of a touch point is used to predict a likely location for that touch point in the next frame. Data concerning the motion of a touch point may comprise, for example, velocity or change in position, and may come from one or more prior frames. In an embodiment, predicting a likely location in a frame is done by considering the motion between two frames-yielding a per-frame displacement and its direction. In an embodiment, predicting a likely location in a frame is done by considering the motion in three or more frames. Using fine touch point positional information from three or more frames may yield a more precise prediction as it can take into account acceleration and changes of direction in addition to per-frame displacement and direction. In an embodiment, more weight is assigned to more recent frame data than to older frame data. A frame matching process then may initially presume that an object's touch point in the current frame i probably corresponds with the touch point in the prior frame (i.e., i−1) that is associated with the predicted likely location closest to the touch point in the current frame.

In an embodiment, data concerning the size (magnitude) of a touch point (e.g., the A and C coefficients of a paraboloid) is determined and stored in connection with one or more frames. A frame matching process may initially presume that the size of a given object in the current frame i probably corresponds with the size of that object in the prior frame (i.e., i−1).

In an embodiment, data concerning the change in size (magnitude) of a touch point over time are determined and stored in connection with one or more frames. In an embodiment, data concerning the change in size of a touch point in a frame (e.g., since the last frame, or over a plurality of frames) is used to predict a likely size for that touch point in the next frame. A frame matching process may initially presume that an object in the current frame i probably corresponds with an object in the prior frame (i.e., i−1) that is associated with the predicted likely size nearest the size of the touch point in the current frame.

In an embodiment, data concerning the change in rotational orientation (e.g., the B coefficient of a paraboloid) of a touch point over time are determined and stored in connection with one or more frames. In an embodiment, data concerning the rotational orientation of a touch point in a frame (e.g., since the last frame, or over a plurality of frames) is used to predict a rotational orientation for that touch point in the next frame. A frame matching process may initially presume that an object in the current frame i probably corresponds with an object in the prior frame (i.e., i−1) that is associated with the predicted likely rotational orientation nearest the rotational orientation of the touch point in the current frame. In an embodiment, the rotational orientation of a touch point could permit single touch point control (e.g., single finger control) of rotation, thus, for example, the rotation of one finger on a screen could provide sufficient information to, for example, rotate a view—a function that traditionally requires two rotating points of contact with a touch surface. Using data describing rotational orientation over time, rotational velocity can be computed. Similarly, data concerning rotational orientation or rotational velocity can be used to compute rotational acceleration. Thus, rotational velocity and rotational acceleration both utilize rotational orientation. Rotational orientation, rotational velocity and/or rotational acceleration may be computed for a touch point and output by or used by the frame matching process.

In an embodiment, heuristics for frame matching include changes in distance and in the velocity vectors of the touch points. In an embodiment, heuristics for frame matching include one or more of the following:
  a. an object's touch point in frame i+1 is probably the touch point in frame i which is geometrically closest to it;
  b. an object's touch point in frame i+1 is probably the touch point in frame i which is closest to the point where it would be predicted to be given the object's velocity history; and
  c. an object's touch point in frame i+1 will be of a similar size to its touch point in frame i.

Other combinations of historical data may be used without departing from the scope of this disclosure. In an embodiment, both prior positions and the velocity histories may be used in a heuristic frame matching process. In an embodiment, prior positions, the velocity histories and size histories may be used in a heuristic frame matching process. In an embodiment, prior positions and other historical information may be used in a heuristic frame matching process. In an embodiment, historical information over a plurality of frames is used in a heuristic frame matching process. Other combinations will be apparent to one of skill in the art in view of the foregoing disclosure.

The present system and methods are described above with reference to block diagrams and operational illustrations of methods and devices comprising a computer system capable of receiving and responding to user input. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While the invention has been particularly shown and described with reference to a preferred embodiment thereof, it will be understood by those skilled in the art that various changes in form and details may be made therein without departing from the spirit and scope of the invention.

What is claimed is:

1. A low-latency touch sensitive device, comprising:
    first and second pluralities of conductors, arranged such that:
        each of the paths of the conductors of the first plurality of conductors cross each of the paths of the conductors of the second plurality of conductors, and wherein
        when the touch sensitive device is not being touched, a negligible amount of signal is coupled between them, and
        when the touch sensitive device is being touched, a non-negligible amount of signal is coupled between them;
    at least one signal processor adapted to process signals present on each of the second plurality of conductors, and for each of the signals present on each of the second plurality of conductors to determine which signals form a non-negligible part thereof, the at least one signal processor being adapted to convert a two-dimensional map representing signal strengths into usable touch events by applying:
        a field flattening procedure that subtracts an offset level to remove crosstalk between rows and columns and compensates for differences in amplitude between particular row/column combinations due to attenuation, thereby creating a field-flattened signal;
        a touch point detection procedure that computes coarse touch points by finding local maxima in the field-flattened signal;
        an interpolation procedure that computes fine touch points from the coarse touch points; and,
        a frame matching procedure that matches calculated touch points to each other across frames.

2. The low-latency touch sensitive device according to claim 1, wherein the at least one signal processor is adapted to compensate for differences in amplitude between row/column combinations by multiplying each of a plurality of locations in the two-dimensional map by a calibration constant for the particular row/column combination.

3. The low-latency touch sensitive device according to claim 1, wherein the at least one signal processor is adapted to apply a field flattening procedure that measures signal strength for each row signal at each of a plurality of column receivers and uses a measured value from a particular column receiver as the offset level that is subtracted from the two-dimensional map at a position of the particular column receiver.

4. The low-latency touch sensitive device according to claim 1, wherein the at least one signal processor is further adapted to apply a field flattening procedure that compensates for differences in amplitude between particular row/column combinations by normalizing touch events to a measured value at a location on a touch surface of the touch sensitive device.

5. The low-latency touch sensitive device according to claim 4, wherein the location comprises a row/column intersection in close proximity to transmitters and receivers.

6. The low-latency touch sensitive device according to claim 1, wherein the at least one signal processor is adapted to apply a touch point detection procedure that compares signal strength at each of a plurality of locations of the two-dimensional map to a plurality of its neighbors and labels a location as a local maximum if it is greater than each of them and above a given threshold.

7. The low-latency touch sensitive device according to claim 1, wherein the at least one signal processor is adapted to apply an interpolation procedure that models capacitive contact of a distributed touch as a second-order function in two dimensions.

8. The low-latency touch sensitive device according to claim 1, wherein the at least one signal processor is adapted to apply an interpolation procedure that fits data associated with the coarse touch points to a paraboloid.

9. The low-latency touch sensitive device according to claim 8, wherein the at least one signal processor is adapted to apply an interpolation procedure that uses a Vandermonde-like matrix to solve for coefficients of a polynomial describing the paraboloid.

10. The low-latency touch sensitive device according to claim 9, wherein the Vandermonde-like matrix is square, having a number of columns that is equal to its number of rows.

11. The low-latency touch sensitive device according to claim 9, wherein the Vandermonde-like matrix is non-square, having a number of columns that is not equal to its number of rows and is overdetermined.

12. The low-latency touch sensitive device according to claim 8, wherein the at least one signal processor is adapted to apply an interpolation procedure that uses a least squares technique.

13. The low-latency touch sensitive device according to claim 9, wherein the polynomial describing the paraboloid is:

$$Ax^2+Cy^2+Dx+Ey+F=z.$$

14. The low-latency touch sensitive device according to claim 9, wherein the polynomial describing the paraboloid is:

$$Ax^2+Bxy+Cy^2+Dx+Ey+F=z.$$

15. The low-latency touch sensitive device according to claim 1, wherein the at least one signal processor is adapted to apply a frame matching procedure that matches a calculated touch point in a first frame to a calculated touch point in a second frame based at least in part on a size of the touch point in the first frame and a size of the touch point in the second frame.

16. The low-latency touch sensitive device according to claim 1, wherein the at least one signal processor is adapted to apply a frame matching procedure that matches a calculated touch point in a first frame to a calculated touch point in a second frame based at least in part on at least one change in distance between a location of the touch point in the first frame and a location of the touch point in the second frame.

17. The low-latency touch sensitive device according to claim 16, wherein the frame matching procedure matches the calculated touch point in the first frame to the calculated touch point in the second frame based at least in part on a velocity vector of the calculated touch point in the first frame and the location of the calculated touch point in the second frame.

18. A method for determining one or more touch locations of one or more capacitive objects on a touch sensitive device, the touch sensitive device comprising at least one receiving wire connected to a receiver and a plurality of transmitting wires connected to a orthogonal signal transmitter, each transmitting wire intersecting with the at least one receiving wire, and each of the transmitting wires carrying a signal that is orthogonal to each of the other transmitting wires, and wherein the presence of a capacitive object in proximity to one or more of the intersections causes a non-negligible amount of signal to couple onto the at least one receiving wire, the method comprising the steps of:

creating a heat map comprising a row for each transmitting wire and a column for each of the at least one receiving wires, and thus, comprising an element for each row/column intersection;

identifying the amount of each of the orthogonal signals present on the at least one receiving wire;

populating each heat map elements with a value reflecting the amount of the orthogonal signal coupled at each corresponding intersection;

locating the one or more local maxima in the heat map;

fitting the heat map data surrounding each local maxima to a model function, the model function having a maximum; and for each fitting to a model function, computing the maximum of the model function and thus one or more touch locations on the touch sensitive device.

19. The method of claim 18, further comprising the steps of:

compensating the heat map prior to the step of locating.

20. The method of claim 19, wherein the step of compensating comprises:

creating a compensation map having values substantially corresponding to the differences in amplitude of the orthogonal signal between the orthogonal signal transmitter and the receiver when each transmitting wire is coupled with each of the at least one receiving wires; and compensating the heat map using the compensation map.

21. The method of claim 19, wherein the step of compensating comprises:

creating a compensation function capable of estimating the differences in amplitude of the orthogonal signal between the orthogonal signal transmitter and the receiver when each transmitting wire is coupled with each of the at least one receiving wires; and compensating the heat map using the compensation function.

22. The method of claim 19, further comprising the steps of:

determining an offset level; and compensating the heat map using the offset level.

23. The method of claim 22, wherein the step of compensating the heat map using the offset level comprises subtracting the offset level from each element of the heat map.

24. The method of claim 19, wherein the step of compensating comprises:

creating an offset level map having values substantially corresponding to the amount of crosstalk present at each intersection absent the presence of a capacitive object in proximity to one or more of the intersections; and compensating the heat map using the offset level map.

25. The method of claim 24, wherein the step of compensating the heat map using the offset level map comprises subtracting from each element of the heat map the corresponding values from the offset level map.

26. The method of claim 18, wherein the model function is a paraboloid.

27. The method of claim 19, wherein the model function is a paraboloid.

28. The method of claim 22, wherein the model function is a paraboloid.

29. The method of claim 24, wherein the model function is a paraboloid.

30. The method of claim 18, further comprising the steps of:

storing, in a temporary storage, data representing each touch location on the touch sensitive device, the data comprising at least one selected from the group consisting of: position, size, and rotational orientation.

31. A method for tracking one or more touch locations of one or more capacitive objects on a touch sensitive device, the touch sensitive device comprising at least one receiving wire connected to a receiver and a plurality of transmitting wires connected to an orthogonal signal transmitter, each transmitting wire intersecting with the at least one receiving wire, and each of the transmitting wires carrying a signal that is orthogonal to each of the other transmitting wires, and wherein the presence of a capacitive object in proximity to one or more of the intersections causes a non-negligible amount of signal to couple onto the at least one receiving wire, the method comprising the steps of:

i) creating an array comprising a row for each transmitting wire and a column for each of the at least one receiving wires, and thus, comprising an element for each row/column intersection;

ii) creating a frame by:
   (1) identifying the amount of each of the orthogonal signals present on the at least one receiving wire;
   (2) populating each element of the array with a value reflecting the amount of the orthogonal signal coupled at each corresponding intersection;

iii) processing the frame by:
   (1) locating the one or more local maxima in the array;
   (2) fitting the array data surrounding each local maximum to a model function, the model function having a maximum;

iv) identifying in the frame one or more touch locations on the touch sensitive device by:
   (1) for each fitting to a model function, computing the maximum of the model function and thus one or more touch locations on the touch sensitive device;

v) storing, in a temporary storage, data corresponding to the frame and at least one of the one or more touch locations on the touch sensitive device identified in the frame;

vi) frame matching, using the data in temporary storage, thereby correlating at least one of the one or more touch locations on the touch sensitive device identified in one frame with at least one of the one or more touch locations on the touch sensitive device identified in another frame;

vii) outputting the one or more touch locations and information concerning the correlation;

viii) repeating steps (ii) through (vii) until no touch locations are being tracked.

32. The method of claim 31, wherein the data corresponding to the frame and at least one of the one or more touch locations on the touch sensitive device identified in the frame comprises at least one selected from the group consisting of: the frame; the processed frame; coordinates corresponding to at least one of the one or more touch locations; a size corresponding to at least one of the one or more touch locations;

and a rotational orientation corresponding to at least one of the one or more touch locations.

33. The method of claim 31, wherein the step of creating a frame occurs at a rate of at least 100 Hz.

34. The method of claim 31, wherein the step of creating a frame occurs at a rate of at least about 1,000 Hz.

35. The method of claim 32, wherein data from at least two frames is used to compute at least one time-based indicator selected from the group consisting of: a distance between one of the one or more touch locations in each of the at least two frames; a rate of speed corresponding to one of the one or more touch locations in each of the at least two frames; and a rotational velocity corresponding to one of the one or more touch locations in each of the at least two frames.

36. The method of claim 35, wherein the at least one time-based indicator is used in connection with the step of frame matching in a subsequent iteration.

37. The method of claim 31, where the information concerning the correlation comprises at least one selected from the group consisting of rotational orientation, rotational velocity, and rotational acceleration.

\* \* \* \* \*